(12) United States Patent
Saito

(10) Patent No.: US 6,536,161 B2
(45) Date of Patent: Mar. 25, 2003

(54) WEATHER STRIP FOR HINGED DOUBLE DOORS

(75) Inventor: Katsushi Saito, Hiroshima (JP)

(73) Assignee: Nishikawa Rubber Co., Ltd., Hiroshima-Ken (JP)

(*) Notice: Subject to any disclaimer, the term of this patent is extended or adjusted under 35 U.S.C. 154(b) by 0 days.

(21) Appl. No.: 09/789,588

(22) Filed: Feb. 22, 2001

(65) Prior Publication Data

US 2001/0017006 A1 Aug. 30, 2001

(30) Foreign Application Priority Data

Feb. 24, 2000 (JP) .......................... 2000-047536

(51) Int. Cl.7 ............................ E06B 7/16; E06B 7/232
(52) U.S. Cl. .......................................... 49/368; 49/496.1
(58) Field of Search .............................. 49/368, 479.1, 49/490.1, 496.1, 498.1

(56) References Cited

U.S. PATENT DOCUMENTS

| | | | | |
|---|---|---|---|---|
| 2,116,330 A | * | 5/1938 | Tjaarda | |
| 2,997,336 A | * | 8/1961 | Huggins et al. | |
| 3,891,112 A | * | 6/1975 | Lycett et al. | 220/1.5 |
| 4,014,585 A | * | 3/1977 | Earnhart | 296/16 |
| 4,930,836 A | * | 6/1990 | Grinn | 296/146 |
| 5,491,875 A | * | 2/1996 | Siladke et al. | 16/346 |
| 5,632,065 A | * | 5/1997 | Siladke et al. | 16/335 |
| 5,782,523 A | * | 7/1998 | Heldt et al. | 296/146.6 |
| 6,053,561 A | * | 4/2000 | Hojnowski et al. | 296/146.11 |
| 6,059,352 A | * | 5/2000 | Heldt et al. | 296/146.6 |

FOREIGN PATENT DOCUMENTS

JP    2000-343954    12/2000

* cited by examiner

Primary Examiner—Daniel P. Stodola
Assistant Examiner—Hugh B. Thompson
(74) Attorney, Agent, or Firm—Sughrue Mion, PLLC

(57) ABSTRACT

A weather strip for hinged double doors, which is to be attached to a door fitting portion of an earlier-closed door of hinged double doors including a pair of left and right, earlier-closed and later-closed doors disposed in a rear portion or a side portion of a vehicle. The weather strip includes a seal portion which is brought into elastic contact with a side end of the later-closed door to thereby seal off an interior side of the vehicle from an exterior side of the vehicle; a flipper-like seal piece molded integrally with an upper end portion or to each of upper and lower end portions of the weather strip, so that a vehicle-interior-side wall surface of the seal piece is brought into elastic contact with a body-side weather strip attached to a circumferential edge of a body-side opening portion when the earlier-closed door is closed, and a vehicle-exterior-side wall surface of the seal piece is brought into elastic contact with a door-fitting-portion-side corner portion of the later-closed door when the later-closed door is closed; and a seal lip portion or a hollow seal portion formed at a portion of the vehicle-exterior-side wall surface of the seal piece which is brought into elastic contact with the later-closed door.

5 Claims, 9 Drawing Sheets

WEATHER STRIP FOR HINGED DOUBLE DOORS

FIELD OF THE INVENTION

The present invention relates to a weather strip for hinged double doors. Particularly, the present invention relates to a weather strips for right/left hinged double doors attached to hinged double doors of a vehicle such as an ambulance having right/left hinged double doors in its rear portion, a one box car having right/left hinged double doors in its side portion, or the like, so as to seal off a fitting portion of the right and left doors when they are closed.

BACKGROUND OF THE INVENTION

As shown in FIGS. 12 to 14, a vehicle has a right/left double hinged back door constituted by a pair of left and right doors, that is, an earlier-closed door (here, left door) 1 and a later-closed door (here, right door) 2. A weather strip 10 is attached to a door fitting portion (parting portion) of the earlier-closed door 1. The weather strip 10 has a hollow seal portion 11 molded integrally therewith. The hollow seal portion 11 is brought into elastic contact with a door fitting portion of the later-closed door 2 when the later-closed door 2 is closed. Thus, the hollow seal portion 11 seals off the interior side of the vehicle from the exterior side thereof. In addition, a flipper-like seal piece 15 is molded integrally with an upper end portion of the weather strip 10.

In the background art, such a seal piece 15 is thin, and designed as follows. That is, a vehicle-interior-side (hereinafter referred to as "interior" simply) wall surface of the seal piece 15 is brought into elastic contact with a body-side weather strip 101 attached to the circumferential edge of an opening portion of a body 100 when the earlier-closed door 1 is closed. In addition, a vehicle-exterior-side (hereinafter referred to as "exterior" simply) of the seal piece 15 is brought into elastic contact with a door-fitting-portion upper corner portion of the later-closed door 2 when the later-closed door 2 is closed.

Incidentally, FIG. 14 is a sectional view taken on line A—A in FIG. 13.

Next, another background-art example will be described with reference to FIGS. 15 to 17. In this example, a body-side weather strip 101 is brought into elastic contact with an earlier-closed door (here, right door) 1 and a later-closed door (here, left door) 2 when the doors are closed. In addition, weather strips 20 attached to the earlier-closed door 1 and the later-closed door 2 respectively are brought into elastic contact with a body 100. In FIG. 14, the reference numeral 102 represents a drip seal attached to the circumferential edge of the opening portion of the body 100 so as to be substantially parallel with the body-side weather strip 101. Thus, the interior side of the vehicle is sealed off from the exterior side thereof.

A flipper-like seal piece 25 similar to the above-mentioned seal piece 15 is molded integrally with a door fitting portion of the weather strip 20 attached to the earlier-closed door 1. When the doors are closed, the interior wall surface of the seal piece 25 is brought into elastic contact with the circumferential edge of the opening portion of the body 100, while the exterior wall surface of the seal piece 25 is brought into elastic contact with the upper corner portion of the door fitting portion of the later-closed door 2.

Incidentally, FIG. 16 is a sectional view taken on line B—B in FIG. 15, and FIG. 17 is a sectional view taken on line C—C in FIG. 15.

However, as described above, the seal pieces 15 and 25 inserted between the body 100 and the later-closed door 2 are made thin simply. Accordingly, the seal lapping quantity of the later-closed door 2 is reduced when the doors are closed.

Therefore, the sealing function becomes so insufficient that there is a problem that water enters the interior side of the vehicle through the circumferences of the seal pieces 15 and 25.

SUMMARY OF THE INVENTION

It is therefore an object of the present invention to provide a weather strip for hinged double doors which is superior in sealing performance so that water can be prevented from entering the interior side of a vehicle.

Other objects and effects of the invention will become apparent from the following description.

In order to achieve the above object, according to the present invention, there is provided a weather strip for hinged double doors, which is to be attached to a door fitting portion of an earlier-closed door of hinged double doors comprising a pair of left and right, earlier-closed and later-closed doors disposed in a rear portion or a side portion of a vehicle, which weather strip comprises: a seal portion which is brought into elastic contact with a side end of the later-closed door to thereby seal off an interior side of the vehicle from an exterior side of the vehicle; a flipper-like seal piece molded integrally with an upper end portion or to each of upper and lower end portions of the weather strip so that a vehicle-interior-side wall surface of the seal piece is brought into elastic contact with a body-side weather strip attached to a circumferential edge of a body-side opening portion when the earlier-closed door is closed, and a vehicle-exterior-side wall surface of the seal piece is brought into elastic contact with a door-fitting-portion-side corner portion of the later-closed door when the later-closed door is closed; and a seal lip portion or a hollow seal portion formed at a portion of the vehicle-exterior-side wall surface of the seal piece which is brought into elastic contact with the later-closed door.

Further, the weather strip for hinged double doors preferably further comprises: a second seal piece molded integrally with an upper side of the seal piece so that a vehicle-interior-side wall surface of the second seal piece is brought into elastic contact with a drip seal attached to an upper side of the body-side weather strip when the earlier-closed door is closed, and a vehicle-exterior-side wall surface of the second seal piece is brought into elastic contact with the later-closed door when the later-closed door is closed; and a seal lip portion or a hollow seal portion formed in a portion of the vehicle-exterior-side wall surface of the second seal piece which is brought into elastic contact with the later-closed door.

Although a weather strip to be attached to hinged double doors constituted by a pair of left and right doors, the invention is also applicable to a weather strip to be attached to hinged double doors comprising a pair of upper and lower doors.

That is, a weather strip for hinged double doors, which is to be attached to a door fitting portion of an earlier-closed door of hinged double doors comprising a pair of upper and lower, earlier-closed and later-closed doors disposed in a rear portion of a vehicle, which weather strip comprises: a seal portion which is brought into elastic contact with a side end of the later-closed door to thereby seal off an interior side of the vehicle from an exterior side of the vehicle;

flipper-like seal pieces molded integrally with a left end portion and a right end portion of the weather strip respectively so that vehicle-interior-side wall surfaces of the seal pieces are brought into elastic contact with a body-side weather strip attached to a circumferential edge of a body-side opening portion when the earlier-closed door is closed, and vehicle-exterior-side wall surfaces of the seal pieces are brought into elastic contact with a door-fitting-portion-side corner portion of the later-closed door when the later-closed door is closed; and seal lip portions or hollow seal portions respectively formed at portions of the vehicle-exterior-side wall surfaces of the seal pieces which are brought into elastic contact with the later-closed door.

Further, the invention is also applicable to a weather strip in which a seal portion is brought into elastic contact with the circumferential edge of the opening portion of the body to thereby seal off the interior side of the vehicle from the exterior side thereof when the earlier-closed door is closed.

In addition, it is preferable that the seal portion is formed into a hollow shape in series and integrally with the hollow seal portion formed in the seal piece.

According to the weather strip for hinged double doors according to the present invention, the weather strip is attached to hinged double doors comprising a pair of left and right, earlier-closed and later-closed doors disposed in a rear portion or a side portion of a vehicle. A seal lip portion or a hollow seal portion is formed in a portion of an exterior wall surface of a seal piece molded integrally with the weather strip. The later-closed door is brought into elastic contact with the seal lip portion or the hollow seal portion when the doors are closed. Thus, in comparison with the case where the thin seal piece is provided singly, the seal lapping quantity of the later-closed door increases in accordance with the bending of the seal lip portion of the hollow seal portion.

Accordingly, the sealing function is enhanced in accordance with the increase of the seal lapping quantity. Thus, water is prevented from entering the interior side of the vehicle through the circumference of the seal piece.

The same effect can be obtained in the invention applied to a weather strip attached to hinged double doors comprising a pair of upper and lower, earlier-closed and later-closed doors, or in the invention applied to a weather strip in which a seal portion is brought into elastic contact with the circumferential edge of the body-side opening portion so as to seal off the interior side of the vehicle from the exterior side thereof when the earlier-closed door is closed.

According to the invention, in addition to the seal lip portion or the hollow seal portion formed on the seal piece brought into elastic contact with the body-side weather strip, a seal lip portion or a hollow seal portion is formed similarly on a second seal piece which is brought into elastic contact with a drip seal attached to the upper side of the body-side weather strip. Thus, the sealing effect is enhanced so that water is further prevented from entering the interior side of the vehicle.

Further, according to the invention, the seal portion is formed into a hollow shape in series and integrally with the hollow seal portion formed on the seal piece. Thus, there is no fear that the door closing property deteriorates particularly when the later-closed door is closed. In addition, there is no fear that the manufacture by die forming is complicated.

PREFERRED EMBODIMENTS OF THE INVENTION

Figure 1:
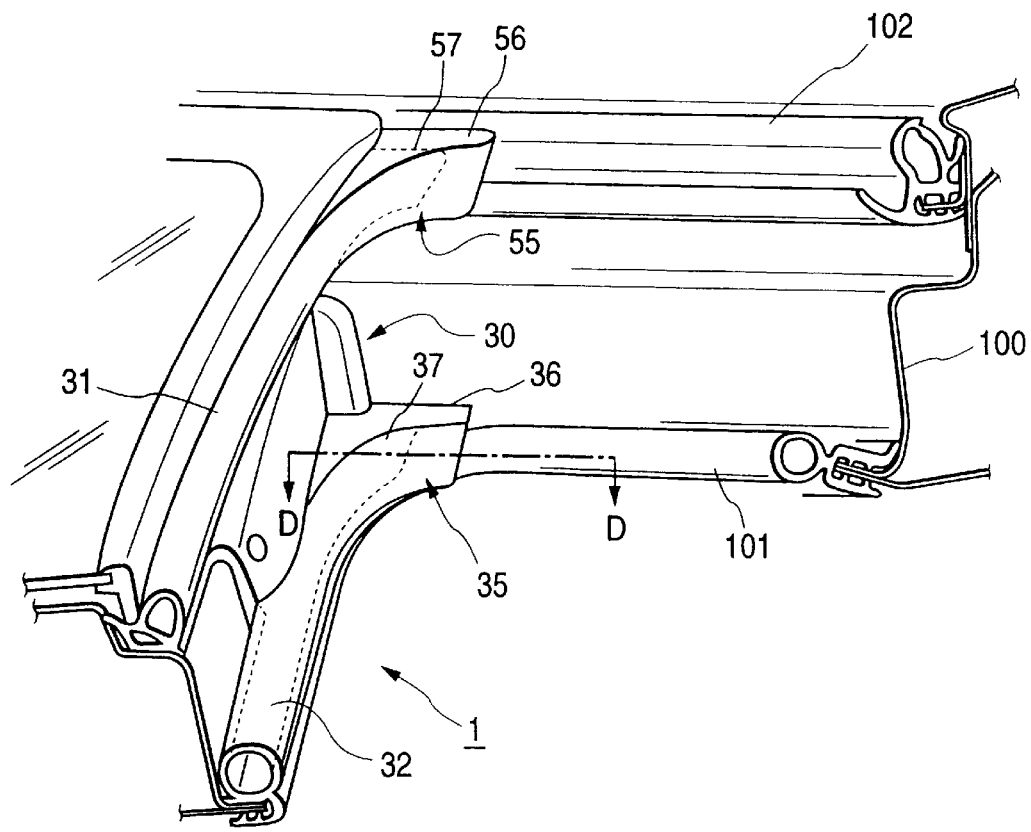
FIG. 1 is a main portion perspective view of an upper portion of a rear portion of a vehicle, showing the state where a weather strip for hinged double doors according to a first embodiment of the present invention has been attached.
Figure 2:
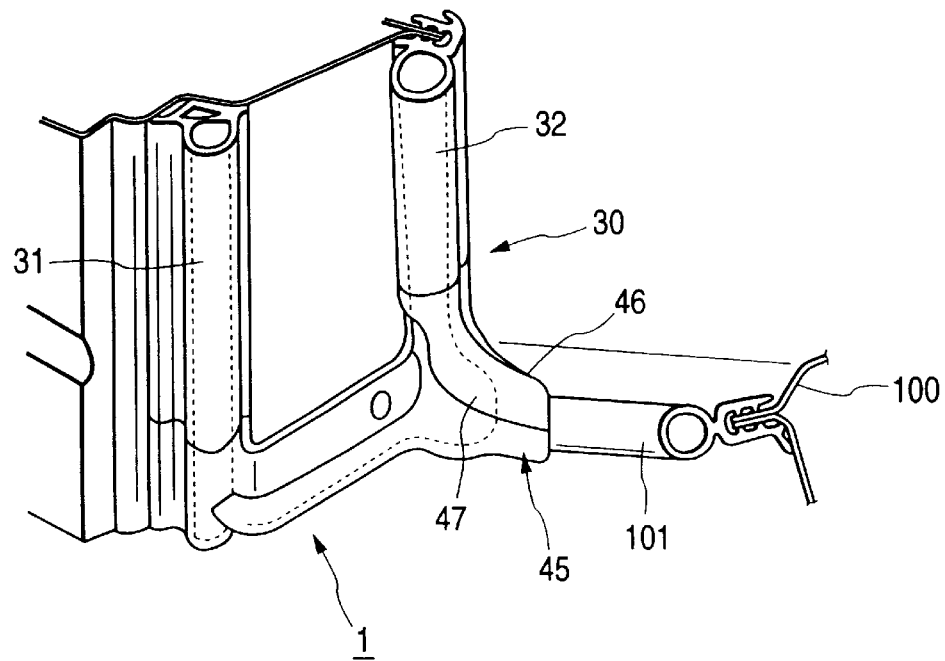
FIG. 2 is a main portion perspective view of a lower portion of the rear portion of the vehicle, showing the state where the weather strip for hinged double doors according to the first embodiment of the present invention has been attached.
Figure 3:
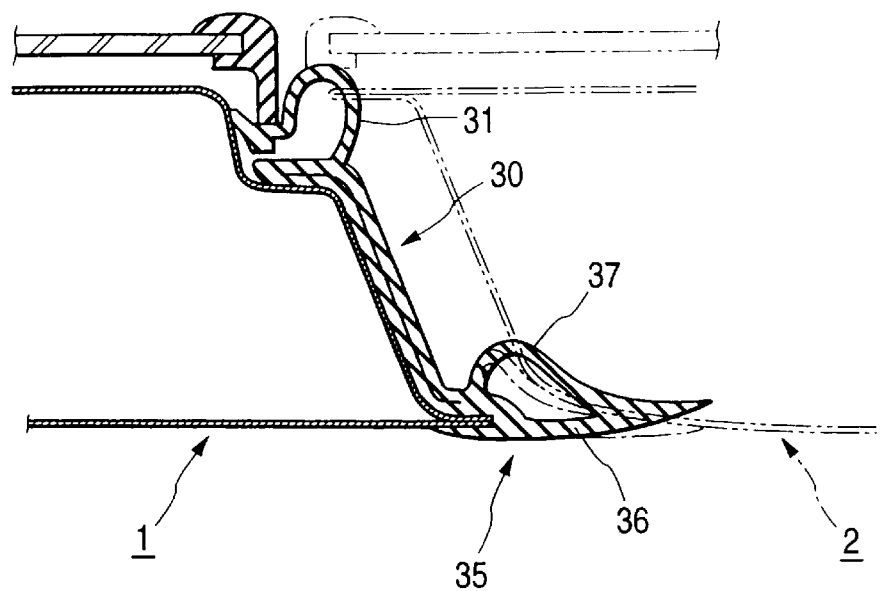
FIG. 3 is a sectional view taken on line D—D in FIG.

First Embodiment:

Description will be made about a weather strip for hinged double doors according to a first embodiment of the present invention with reference to FIGS. 1 to 3. FIG. 1 shows the state of an upper side of a rear portion of a vehicle to which the weather strip for hinged double doors has been attached. FIG. 2 shows the state of a lower portion of the rear portion of the vehicle. FIG. 3 shows a section taken on line D—D in FIG. 1. Incidentally, parts the same as those in the background-art example are referenced correspondingly.

Figure 13:
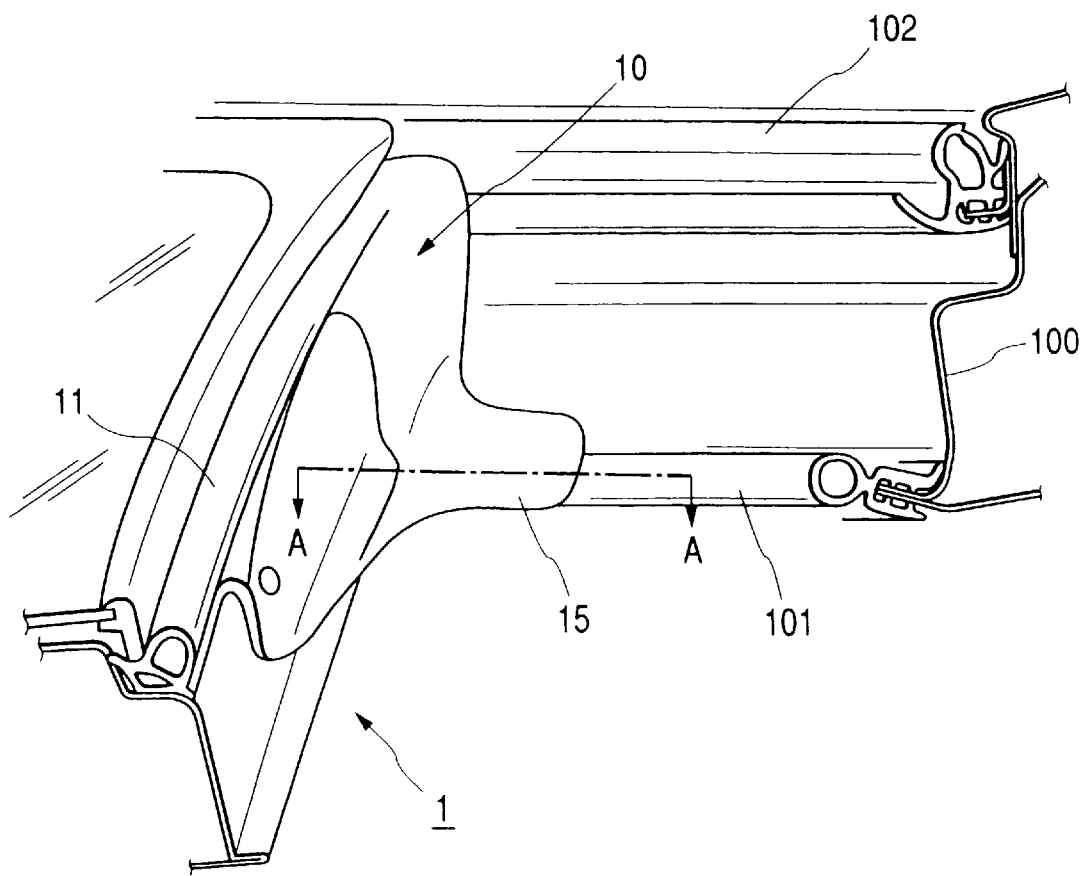
FIG. 13 is a main portion perspective view of a rear portion of a vehicle, showing the state where a weather strip for hinged double doors according to a background-art example has been attached.
Figure 14:
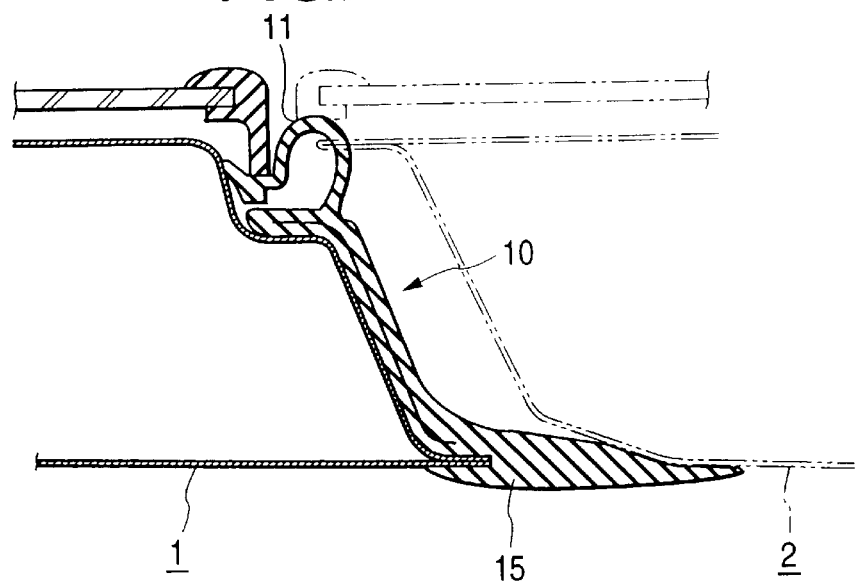
FIG. 14 is a sectional view taken on line A—A in FIG. 13.
Figure 15:
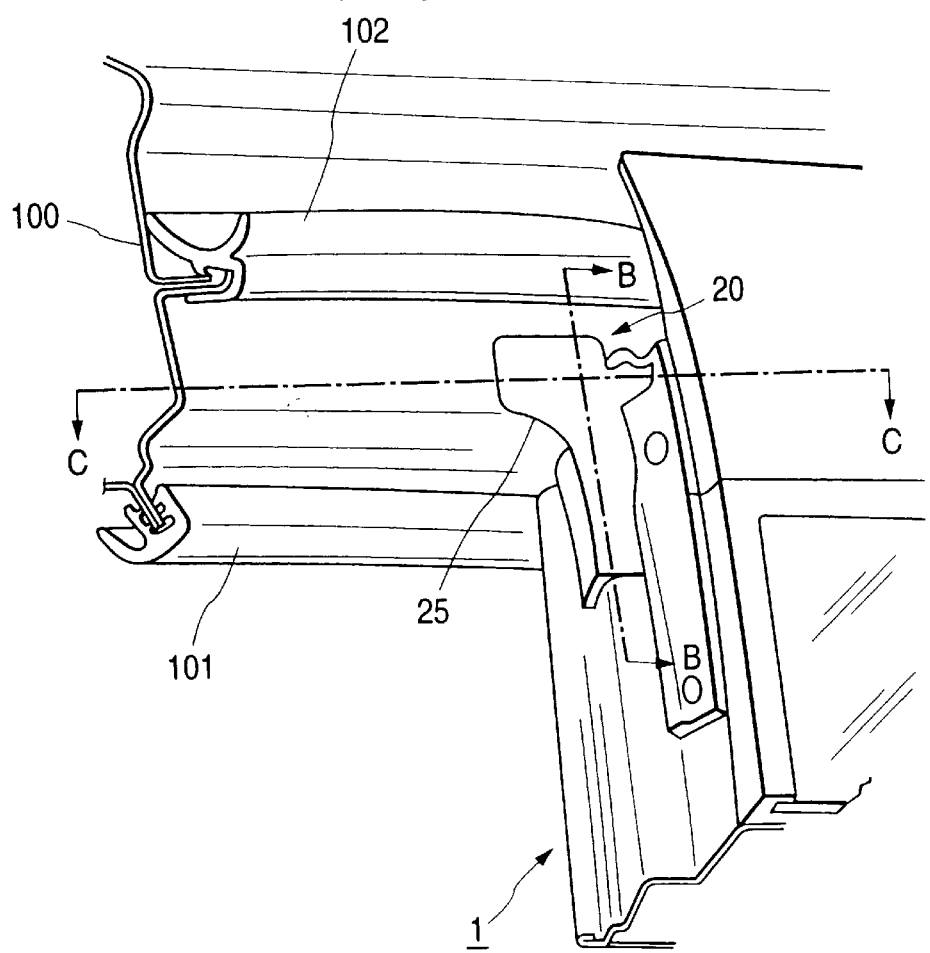
FIG. 15 is a main portion perspective view of a rear portion of a vehicle, showing the state where a weather strip for hinged double doors according to another background-art example has been attached.
Figure 16:
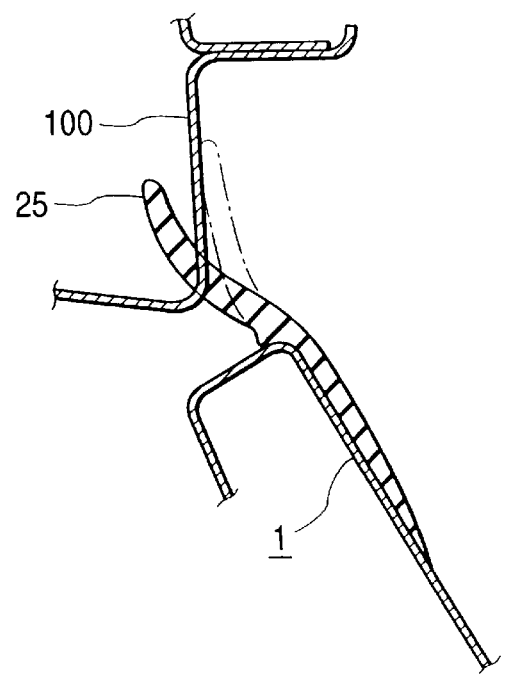
FIG. 16 is a sectional view taken on line B—B in FIG. 15.
Figure 17:
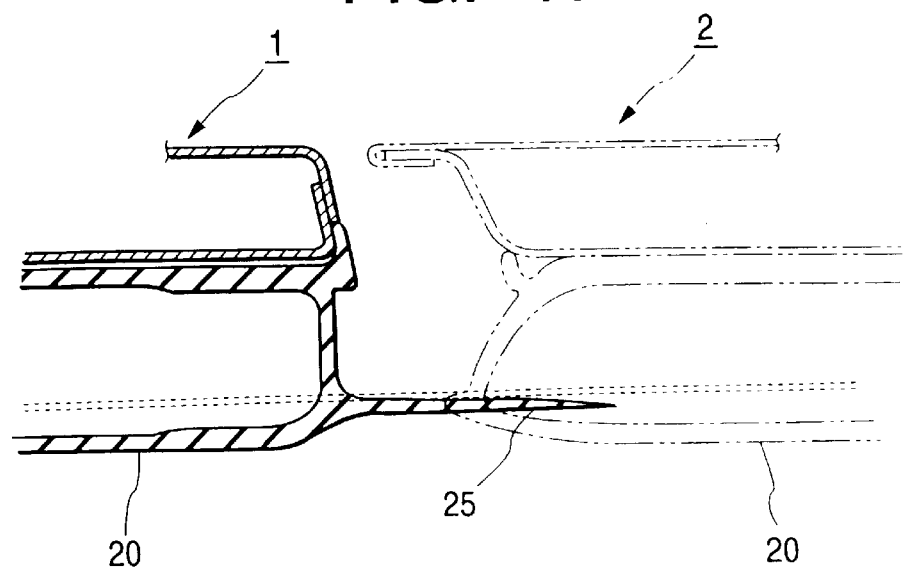
FIG. 17 is a sectional view taken on line C—C in FIG. 15.

In the same manner as the weather strip 10 for hinged double doors (see FIGS. 13 and 14) shown in the background-art example, a weather strip 30 for hinged double doors according to the first embodiment of the present invention is a so-called double seal type weather strip configured as follows. That is, the door weather strip 30 is attached to right/left hinged double doors. The hinged double doors are constituted by a pair of left and right doors, that is, an earlier-closed door (left door in this embodiment) 1 and a later-closed door (right door in this embodiment) 2 disposed in a rear portion of a vehicle. The door weather strip 30 is attached along the door-fitting-portion-side end (right end in FIGS. 1 and 2) of the earlier-closed door 1. The door weather strip 30 has an outer seal portion 31 which has a hollow shape and which is molded integrally with the exterior side of a side end of the door weather strip 30, and an inner seal portion 32 which has a hollow shape similarly and which is molded integrally with the interior side of the side end of the door weather strip 30. When the doors are closed, the outer and inner seal portions 31 and 32 are brought into elastic contact with the side end of the later-closed door 2 so as to seal off the interior side of the vehicle from the exterior side thereof.

Seal members 35 and 45 are formed in upper and lower end portions of the door weather strip 30, respectively, so as to extend in series and integrally with the inner seal portion 32.

Specific description will be made about the seal member 35 molded integrally with the upper end portion of the door weather strip 30. As shown in FIG. 3, the seal member 35 is constituted by a flipper-like thin seal piece 36 and a hollow seal portion 37. The hollow seal portion 37 is formed in a portion of the exterior wall surface of the seal piece 36. When the earlier-closed door 1 is closed, the interior wall surface of the seal piece 36 constituting the seal member 35 is brought into elastic contact with a body-side weather strip 101. The body-side weather strip 101 has been attached to the circumferential edge of an opening portion of a body 100. When the later-closed door 2 is closed, the exterior wall surface of the seal piece 36 is brought into elastic contact with the upper corner portion on the door-fitting-portion side and on the interior side of the later-closed door 2 through the hollow seal portion 37.

Incidentally, the seal member 45 molded integrally with the lower end portion of the door weather strip 30 is configured in the same manner as the seal member 35 of the upper end portion. That is, the seal member 45 is constituted by a seal piece 46 and a hollow seal portion 47 formed on the exterior wall surface of the seal piece 46. The lower corner portion on the door-fitting-portion side and on the interior side of the later-closed door 2 is brought into elastic contact with the hollow seal portion 47.

Thus, the hollow seal portions 37 and 47 are molded integrally with the thin seal pieces 36 and 46 so as to generate bending with respect to the later-closed door 2 when the later-closed door 2 is brought into elastic contact with the seal members 35 and 45 when the doors are closed. Accordingly, in comparison with the case where the thin seal pieces 36 and 46 are provided singly, the seal lapping quantity of the later-closed door 2 increases in accordance with the bending of the hollow seal portions 37 and 47. As a result, the sealing function is enhanced.

In addition, on the further upper portion of the seal piece 36 formed in the upper end portion of the door weather strip 30, a second seal member 55 is formed to extend in series and integrally with the outer seal portion 31. The seal member 55 is constituted by a flipper-like thin seal piece 56 and a hollow seal portion 57 formed in a portion of the exterior wall surface of the seal piece 56, in the same manner as the seal member 35. The interior wall surface of the seal piece 56 is brought into elastic contact with a drip seal 102 when the earlier-closed door 1 is closed. The drip seal 102 has been attached to an upper end portion of the above-mentioned body-side weather strip 101 at the circumferential edge of the opening portion of the body 100. On the other hand, the exterior wall surface of the seal piece 56 is brought into elastic contact with the upper corner portion on the door-fitting-portion side and on the exterior side of the later-closed door 2 through the hollow seal portion 57 when the later-closed door 2 is closed.

Thus, the seal lapping quantity of the later-closed door 2 can be increased by the bending of the hollow seal portion 57 in the same manner as those by the seal members 35 and 45. As a result, the sealing function is enhanced.

Figure 4:
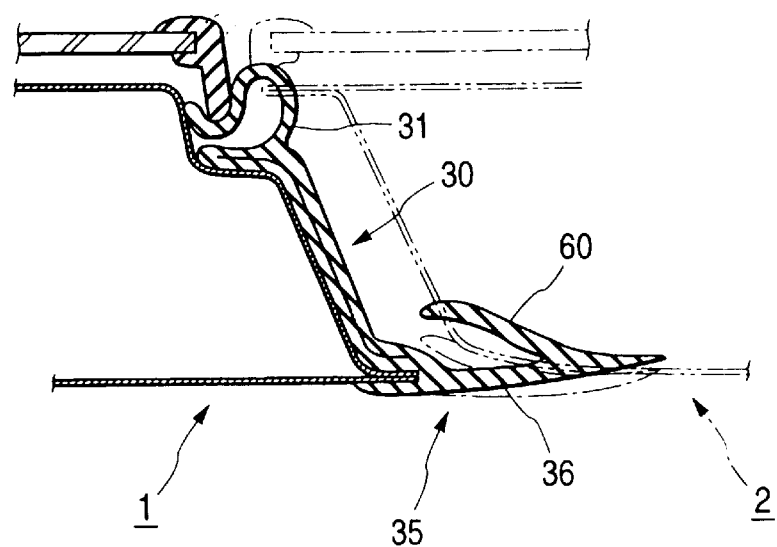
FIG. 4 is a sectional view taken on line D—D in FIG. 1, showing another aspect.

Incidentally, in the above-mentioned first embodiment, the hollow seal portions 37, 47 and 57 were provided for the seal pieces 36, 46 and 56 so as to obtain bending based on elastic contact with the later-closed door 2 when the doors were closed. However, instead of the hollow seal portions 37, 47 and 57, seal lip portions 60 as shown in FIG. 4 may be provided on the exterior sides of the seal pieces 36, 46 and 56 so that the tip end portions of the seal lip portions 60 float from the seal pieces 36, 46 and 56 respectively. In this case, a similar effect can be obtained.

The seal members 35 and 45 were provided in the upper and lower end portions of the door weather strip 30. Accordingly, however, only one seal member may be provided in the upper end portion. Further, although the hollow seal portion 57 was provided for the seal piece 56 which was to be brought into elastic contact with the drip seal 102, the hollow seal portion 57 may be omitted. Also in a single seal type weather strip, for example, a weather strip having no inner seal portion 32 in the first embodiment, instead of the double seal type weather strip, the seal members 35 and 45 may be provided in the upper end portion and the lower end portion of the weather strip similarly to the above case.

Figure 5:
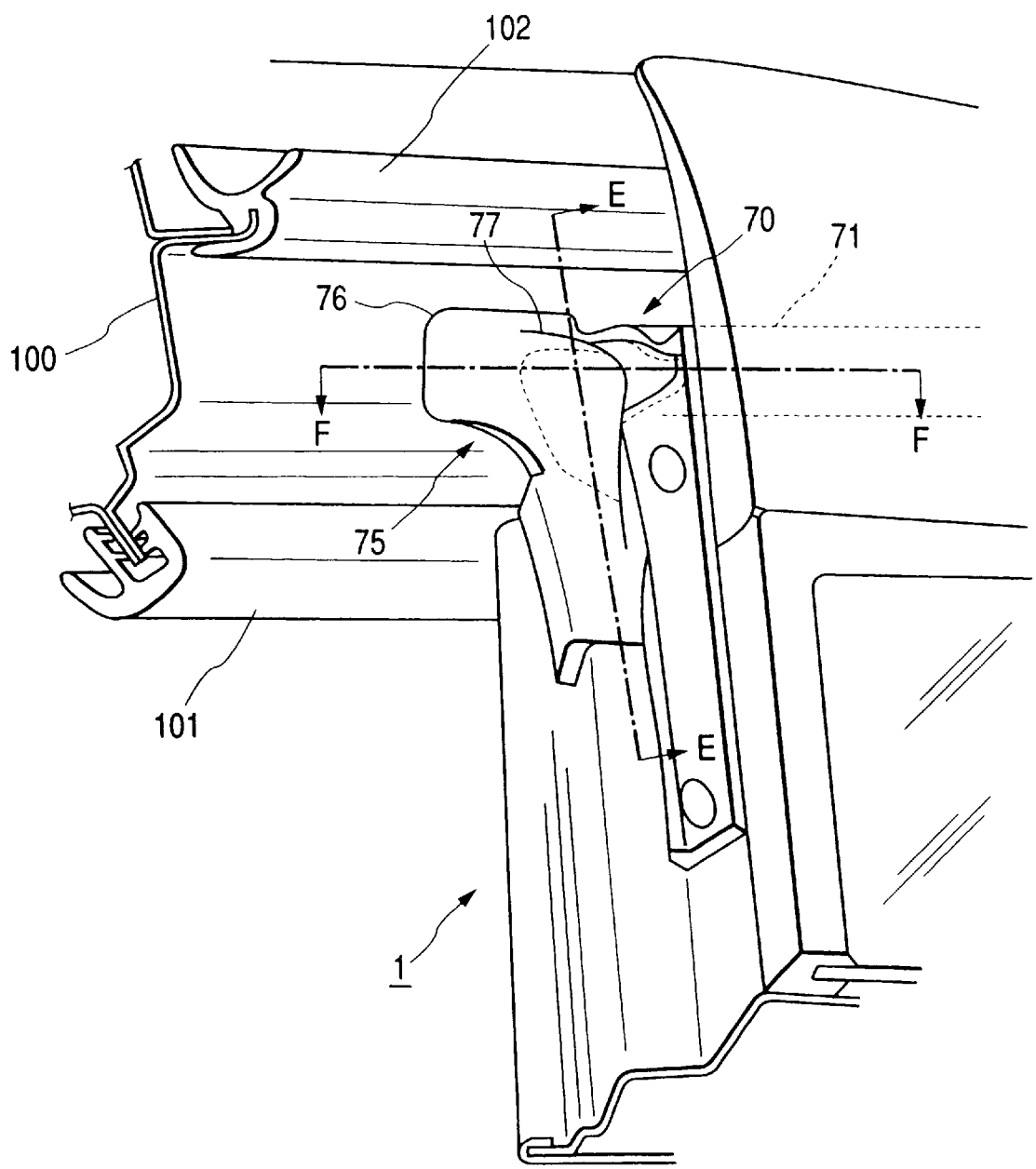
FIG. 5 is a main portion perspective view of an upper portion of a rear portion of a vehicle, showing the state where a weather strip for hinged double doors according to a second embodiment of the present invention has been attached.
Figure 6:
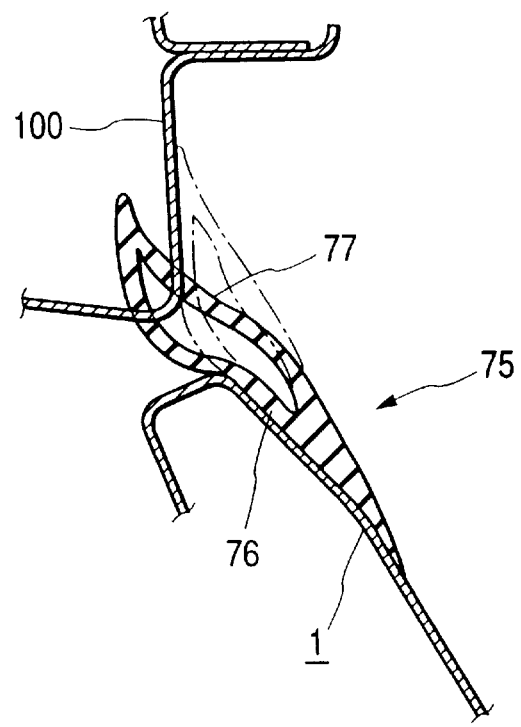
FIG. 6 is a sectional view taken on line E—E in FIG. 5.
Figure 7:
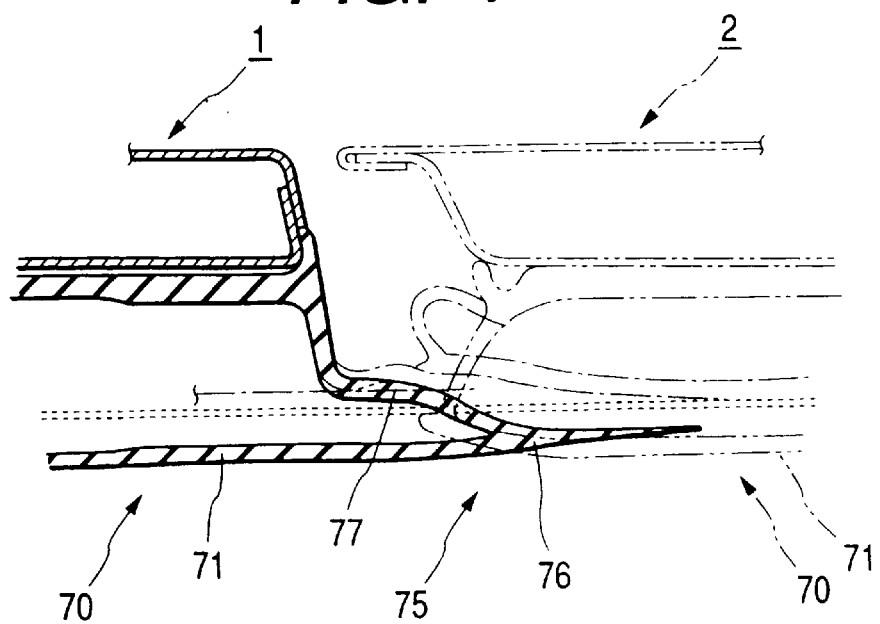
FIG. 7 is a sectional view taken on line F—F in FIG. 5.

Second Embodiment:

Next, description will be made about a weather strip for hinged double doors according to a second embodiment of the present invention with reference to FIGS. 5 to 7. FIG. 5 shows the upper side of a rear portion of a vehicle to which the weather strip for hinged double doors has been attached. FIG. 6 shows a section taken on line E—E in FIG. 5, and FIG. 7 shows a section taken on line F—F in FIG. 5. Parts the same as those in the background-art example are referenced correspondingly.

In the first embodiment, the weather strip 30 for hinged double doors was attached to the door-fitting-portion side of the earlier-closed door 1, and the seal members 35 and 45 were provided respectively in the upper and lower end portions of the door weather strip 30. However, a weather strip 70 for hinged double doors according to the second embodiment of the present invention is attached horizontally to the upper end portion of an earlier-closed door 1 of hinged double doors. The hinged double doors are constituted by a pair of right and left doors, that is, the earlier-closed door 1 (right door in this embodiment) and a later-closed door 2 (left door in this embodiment). In addition, a seal member 75 is provided in the door-fitting-portion side end portion (left end portion in this embodiment) of the door weather strip 70. In the door weather strip 70, a seal portion 71 having a hollow shape is brought into elastic contact with the circumferential edge of the opening portion of the body 100 when the earlier-closed door 1 is closed. Thus, the interior side of the vehicle is sealed off from the exterior side thereof.

The seal member 75 is constituted by a seal piece 76 and a hollow seal portion 77 formed on the exterior wall surface of the seal piece 76, in the same manner as the seal members 35 and 45 shown in the first embodiment. When the doors are closed, the interior wall surface of the seal piece 76 is brought into the circumferential edge of the opening portion of the body 100, and the exterior wall surface of the seal piece 76 is brought into elastic contact with the upper corner portion of the door-fitting-portion of the later-closed door 2 through the hollow seal portion 77. Thus, a large seal lapping quantity can be ensured. In addition, the seal member 75 is formed in series and integrally with the seal portion 71 having a hollow shape.

Incidentally, the weather strip 70 for hinged double doors may be attached horizontally to the lower end portion of the earlier-closed door 1 with the seal member 75 being provided in the door-fitting-portion-side end of the door weather strip 70.

Figure 8:
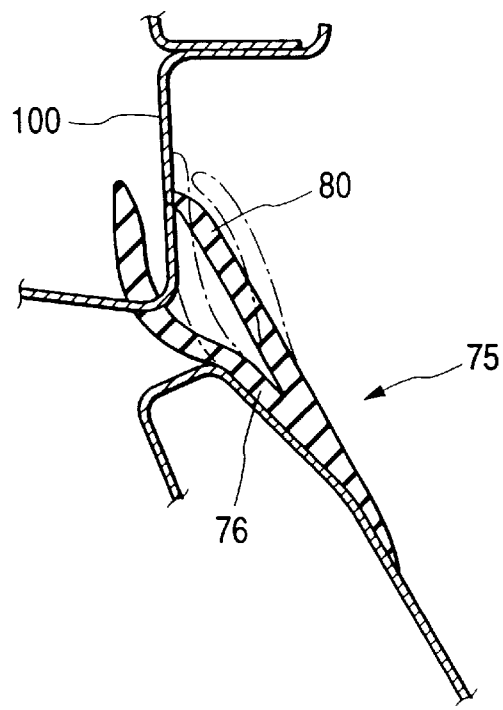
FIG. 8 is a sectional view taken on line E—E in FIG. 5, showing another aspect.
Figure 9:
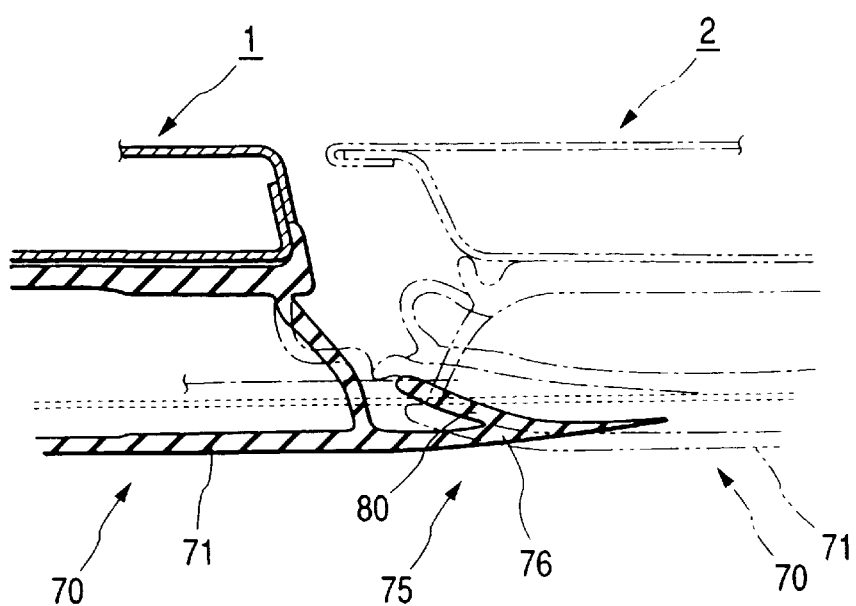
FIG. 9 is a sectional view taken on line F—F in FIG. 5, showing another aspect.

In addition, as shown in FIGS. 8 and 9, a seal lip portion 80, instead of the hollow seal portion 77, may be provided on the exterior wall surface of the seal piece 76 so that the tip end portion of the seal lip portion 80 is made to float from the seal piece 76.

Figure 10:
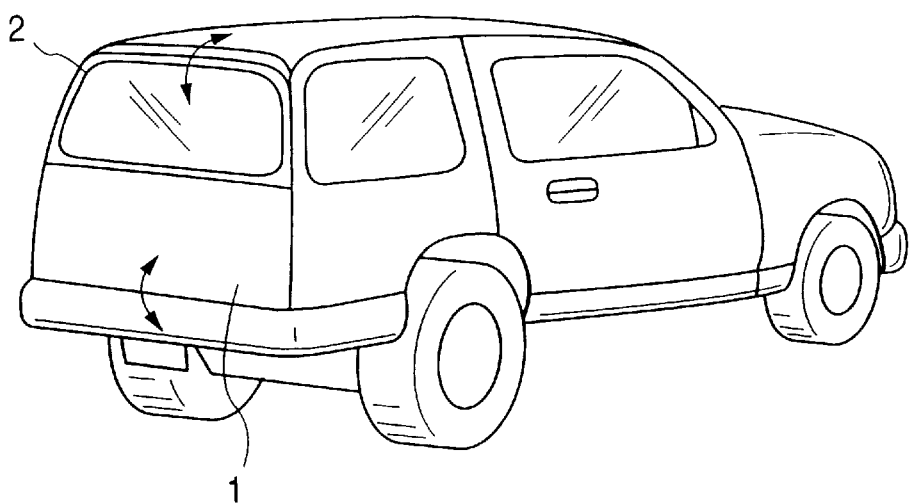
FIG. 10 is an external-appearance perspective view showing a vehicle having upper/lower hinged double doors.

The above-mentioned first and second embodiments showed the weather strips 30 and 70 for hinged double doors which were attached to the hinged double doors constituted by a pair of left and right doors, that is, the earlier-closed door 1 and the later-closed door 2 disposed in the rear portion of the vehicle. However, they may be attached to hinged double doors constituted by a pair of upper and lower, earlier-closed and later-closed doors 1 and 2 disposed in a rear portion of a vehicle as shown in FIG. 10.

Figure 11:
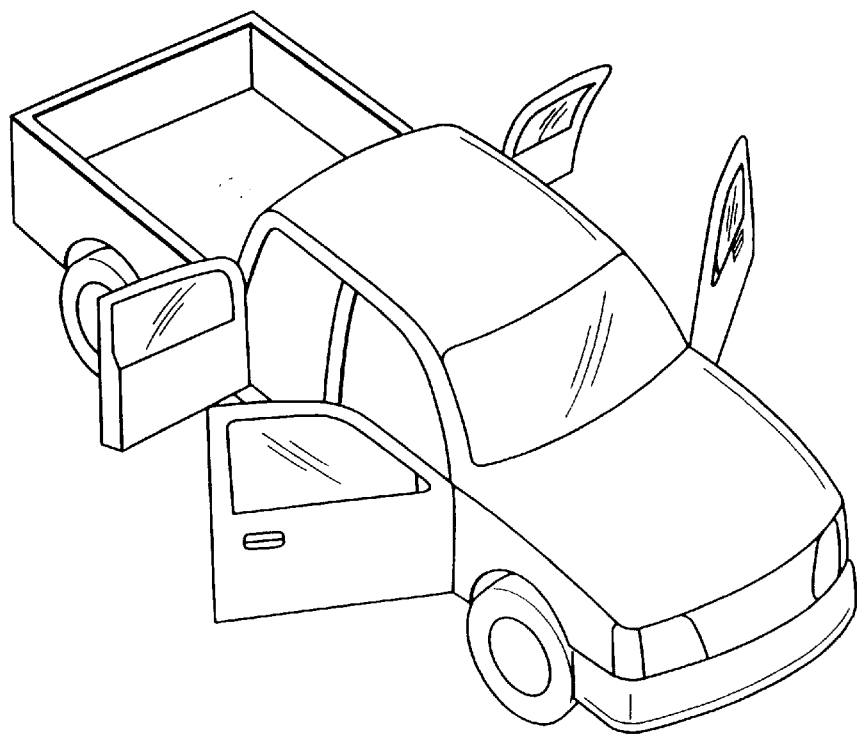
FIG. 11 is an external-appearance perspective view showing a vehicle having right/left hinged double doors in its side portion.
Figure 12:
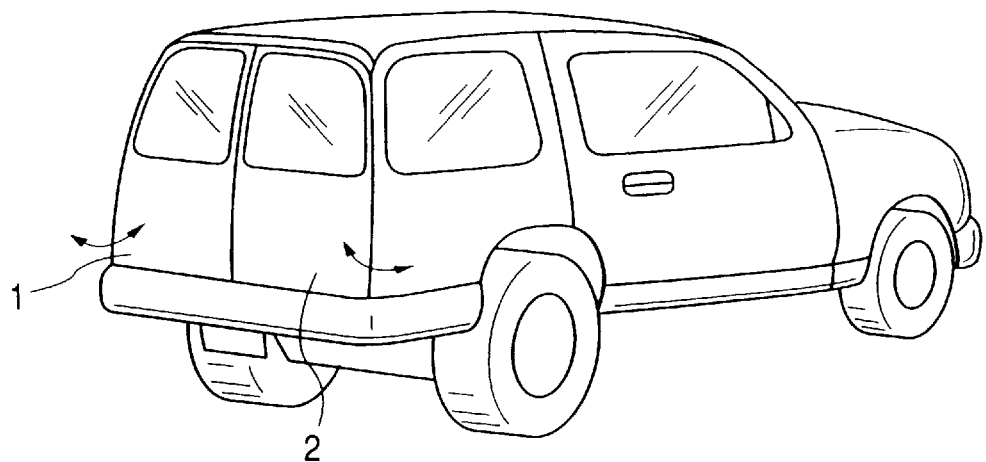
FIG. 12 is an external-appearance perspective view showing a vehicle having right/left hinged double doors.

Further, though description is omitted, the present invention may be applied to hinged double doors constituted by a pair of left and right, earlier-closed and later-closed doors disposed in a side portion of a vehicle as shown in FIG. 11.

As has been described, according to the weather strip for hinged double doors of the present invention, the seal lapping quantity of a later-closed door can be increased by a seal lip portion or a hollow seal portion formed on a seal piece of the weather strip, in comparison with that by a seal piece shown in the background-art example. Thus, the sealing function is enhanced so that water can be prevented from entering the interior side of the vehicle through the circumference of the seal piece.

According to another embodiment of the invention, in addition to the seal lip portion or the hollow seal portion formed on the seal piece brought into elastic contact with the body-side weather strip, a seal lip portion or a hollow seal portion is formed similarly on a second seal piece which is brought into elastic contact with a drip seal attached to the upper side of the body-side weather strip. Thus, the sealing effect is enhanced so that water is further prevented from entering the interior side of the vehicle.

Further, according to still other embodiment of the invention, the seal portion is formed into a hollow shape in series and integrally with the hollow seal portion formed on the seal piece. Thus, there is no fear that the door closing property deteriorates particularly when the later-closed door is closed. In addition, there is no fear that the manufacture by die forming is complicated.

While the invention has been described in detail and with reference to specific embodiments thereof, it will be apparent to one skilled in the art that various changes and modifications can be made therein without departing from the spirit and scope thereof.

What is claimed is:

1. A weather strip in combination with a pair of side-by-side hinged double doors of a vehicle that close sequentially, comprising:

said side-by-side doors include:
      a first door which closes sequentially before a second door;
   said weather strip includes:
      an outer seal portion which is brought into elastic contact with a side end of said second door to thereby seal off an interior side of said vehicle from an exterior side of said vehicle;
      a flipper shaped seal piece molded integrally with an upper end portion or to each of upper and lower end portions of said weather strip, so that a vehicle-interior-side wall surface of said seal piece is brought into elastic contact with a body-side weather strip attached to a circumferential edge of a body-side opening portion when said first door is closed, and a vehicle-exterior-side wall surface of said seal piece is capable of elastically contacting a door-fitting-portion-side corner portion of said second door when said second door is closed; and
      a seal lip portion or a hollow seal portion formed at a portion of said vehicle-exterior-side wall surface of said seal piece which is brought into elastic contact with said second door.

2. The weather strip for hinged double doors according to claim 1, further comprising:
   a second seal piece molded integrally with an upper side of said seal piece so that a vehicle-interior-side wall surface of said second seal piece is brought into elastic contact with a drip seal attached to an upper side of said body-side weather strip when said first door is closed, and a vehicle-exterior-side wall surface of said second seal piece is brought into elastic contact with said second door when said second door is closed; and
   a seal lip portion or a hollow seal portion formed at a portion of said vehicle-exterior-side wall surface of said second seal piece which is brought into elastic contact with said second door.

3. The weather strip for hinged double doors according to claim 1, wherein said outer seal portion has a hollow shape, and said outer seal portion is formed in series and integrally with said hollow seal portion formed on said seal piece.

4. A weather strip in combination with sequentially closing hinged double doors comprising:
   a first door that closes sequentially before a second door, wherein the first and second door comprise a pair of upper and lower doors disposed in a rear portion of a vehicle, and wherein the first door includes a door fitting portion;
   an outer seal portion which is brought into elastic contact with a side end of said second door to thereby seal off an interior side of said vehicle from an exterior side of said vehicle;
   flipper shaped seal pieces molded integrally with a left end portion and a right end portion of said weather strip, respectively, so that vehicle-interior-side wall surfaces of said seal pieces are brought into elastic contact with a body-side weather strip attached to a circumferential edge of a body-side opening portion when said first door is closed, and vehicle-exterior-side wall surfaces of said seal pieces are brought into elastic contact with a door-fitting-portion-side corner portion of said second door when said second door is closed; and
   seal lip portions or hollow seal portions respectively formed at portions of said vehicle-exterior-side wall surfaces of said seal pieces which are brought into elastic contact with said second door.

5. A weather strip in combination with side-by-side hinged double doors comprising:
   the hinged double doors include:
      a first and second door which are sequentially closed, respectively, said first door having an upper end portion and lower end portion, and wherein the hinged double doors are disposed in a rear portion or a side portion of a vehicle;

the weather strip includes:
  a seal portion which is brought into elastic contact with a circumferential edge of a body-side opening portion to thereby seal off an interior side of said vehicle from an exterior side thereof when said first door is closed;
  a flipper shaped seal piece molded integrally with a door-fitting-side end portion of said weather strip so that a vehicle-interior-side wall surface of said seal piece is brought into elastic contact with said circumferential edge of said body-side opening portion when said first door is closed, and a vehicle-exterior-side wall surface of said seal piece is brought into elastic contact with a door-fitting-portion-side corner portion of said second door when said second door is closed; and
  a seal lip portion or a hollow seal portion formed in a portion of said vehicle-exterior-side wall surface of said seal piece which is brought into elastic contact with said second door.

\* \* \* \* \*